United States Patent
Dillinger et al.

(10) Patent No.: US 6,519,240 B1
(45) Date of Patent: Feb. 11, 2003

(54) METHOD AND BASE STATION SYSTEM FOR CHANNEL ALLOCATION IN A RADIO COMMUNICATION SYSTEM

(75) Inventors: Markus Dillinger, München (DE); Jürgen Schindler, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/708,294

(22) Filed: Nov. 8, 2000

Related U.S. Application Data

(63) Continuation of application No. PCT/DE99/01301, filed on May 3, 1999.

(30) Foreign Application Priority Data

May 8, 1999 (DE) .......................................... 198 20 736

(51) Int. Cl.[7] .......................... H04B 7/212; H04Q 7/28
(52) U.S. Cl. .................... 370/337; 370/341; 455/509
(58) Field of Search ................. 370/320, 321, 370/322, 314, 330, 337, 347, 328, 342, 331, 468, 478, 477, 442, 280, 281, 329, 341, 335; 455/442, 507, 436, 422, 509, 517, 524, 525, 464, 452

(56) References Cited

U.S. PATENT DOCUMENTS

| | | | |
|---|---|---|---|
| 5,572,516 A | * 11/1996 | Miya et al. | ..................... 370/18 |
| 5,719,859 A | 2/1998 | Kobayashi et al. | |
| 5,774,790 A | * 6/1998 | Dupuy | ....................... 455/33.1 |
| 6,031,827 A | * 2/2000 | Rikkinen et al. | ............ 370/330 |
| 6,130,886 A | * 10/2000 | Ketseoglou et al. | ......... 370/347 |

FOREIGN PATENT DOCUMENTS

| | | |
|---|---|---|
| DE | 195 49 148 A1 | 7/1997 |
| EP | 0 536 864 A2 | 4/1993 |
| EP | 0 720 405 A2 | 7/1996 |

OTHER PUBLICATIONS

Published International Patent Application No. WO 97/12489 (Petranovich et al.), dated Apr. 3, 1997, as mentioned on p. 1 of the specification.

Published International Patent Application No. WO 91/01073 (Bajwa), dated Jan. 24, 1991.

Published International Patent Application No. WO 98/29988 (Fong et al.), dated Jul. 9, 1998.

"Dynamic Channel Assignment and Signaling", IEEE Personal Communications, dated Jun. 1996, vol. 3, No. 3, pp. 10–31.

"Channel Assignment Schemes for Cellular Mobile Telecommunication Systems: A Comprehensive Survey" (I. Katzela et al.).

"Radio Resource Allocation in Fixed Broadband Wireless Networks" (Fong et al.), dated Jun. 1998.

* cited by examiner

*Primary Examiner*—Huy D. Vu
*Assistant Examiner*—Duc Ho
(74) *Attorney, Agent, or Firm*—Laurence A. Greenberg; Werner H. Stemer; Ralph E. Locher

(57) ABSTRACT

According to the invention, a first portion of the timeslots is allocated to a first base station and a second portion of the timeslots is allocated to a second base station, in particular, in the downlink direction of a radio communications system having a TDD frame structure and broadband radio transmission with CDMA subscriber separation. The interference between adjacent base stations is thus considerably reduced without the assistance of any FDMA component, that is to say, in the worst case, for a radio communications system having a frequency reuse cluster of unity.

9 Claims, 4 Drawing Sheets

METHOD AND BASE STATION SYSTEM FOR CHANNEL ALLOCATION IN A RADIO COMMUNICATION SYSTEM

CROSS-REFERENCE TO RELATED APPLICATION

This is a continuation of copending international application PCT/DE99/01301, filed May 3, 1999, which designated the United States.

BACKGROUND OF THE INVENTION

FIELD OF THE INVENTION

The invention relates to a method and a base station system for channel allocation in a radio communications system, in particular in a mobile radio system having broadband channels, in which signals are transmitted in accordance with a TD/CDMA subscriber separation method.

Mobile radio systems in which radio cells which use the same frequency band each have separate timeslots are described in EP 0 536 864 A and WO 97/12489. The timeslots are in this case split up both for the downlink direction and for the uplink direction.

In radio communications systems, information (for example voice, video information or other data) is transmitted using electromagnetic waves via a radio interface between a transmitting and a receiving radio station (base station and mobile station, respectively). The electromagnetic waves are in this case transmitted at carrier frequencies which are in the frequency band intended for the respective system. Frequencies in the frequency band around 2000 MHz have been provided for future mobile radio systems using CDMA or TD/CDMA transmission methods via the radio interface, for example the UMTS (Universal Mobile Telecommunication System) or other 3rd generation systems.

Frequency division multiplex (FDMA), time division multiplex (TDMA) or a method which is known as code division multiplex (CDMA) are used to distinguish between the signal sources, and thus for evaluation of the signals. A radio communications system using the TDMA transmission method is known from U.S. Pat. No. 5,719,859 A.

A radio communications system which combines these methods is known from DE 195 49 148 A1. In contrast, the GSM mobile radio system uses only a combination of FDMA and TDMA. Both systems use a frequency reuse cluster of considerably more than unity, so that the interference between adjacent base stations is reduced by the FDMA component. In systems such as these, channel allocation methods always relate exclusively to the FDMA component.

SUMMARY OF THE INVENTION

It is accordingly an object of the invention to provide a method and a base station system which overcomes the above-mentioned disadvantageous of the prior art apparatus and methods of this general type, and in which the interference is reduced even when the frequency reuse cluster tends to unity.

With the foregoing and other objects in view there is provided, in accordance with the invention a method for channel allocation in a radio communications system, which includes using a TDMA transmission method to carrying out radio transmission between mobile stations and base stations; allocating at least partially different timeslots to a first base station and to a second base station for transmissions in a downlink direction; and transmitting in an uplink direction without splitting the timeslots between the first base station and the second base station.

According to the invention, a first portion of the timeslots is allocated to a first base station and a second portion of the timeslots is allocated to a second base station. The interference between adjacent base stations is thus extremely reduced without the assistance of any FDMA component, that is to say, in the worst case, for a radio communications system having a frequency reuse cluster of unity. A fixed allocation to two base stations thus results in a time cluster of two. If further portions of the timeslots are allocated to further base stations, then a time cluster of three, four etc., can be produced.

In contrast to known radio communications systems, the resource "timeslot" is split up within the system. This is advantageous in particular in broadband radio communications systems, in which only a small number of frequency bands are available, for example in the "unpaired band" for the 3rd mobile radio generation. One advantageous application is a mobile radio system using a TDD transmission method (time division duplex) between mobile stations and base stations, in which timeslots in one frequency band are used for the uplink direction and downlink direction.

In accordance with an added feature of the invention, the allocation of the first and second portions of the timeslots is exclusive, so that the base stations transmit and receive only in the timeslots allocated to them. In this case, the interference between the base stations is considerably reduced.

A major advantage with regard to best-possible utilization of the radio resources is provided by a hybrid channel allocation method. In this case, the first and second portions of the timeslots are permanently allocated, and a third portion of the timeslots is allocated dynamically. The hybrid channel allocation method combines the advantages of the permanent and dynamic channel allocation concepts, in this context see I. Katzela and M. Naghshineh, "Channel Assignment Schemes for Cellular Mobile Telecommunication Systems: A Comprehensive Survey", IEEE Personal Communications, June 1996, pages 10–31. The partially permanent allocation keeps the signaling complexity low, and the partially dynamic allocation concentrates a high data rate onto individual cells. The latter is possible, in particular, if the third portion of the timeslots can be allocated to a plurality of base stations on a load-related basis. Thus, even high data rates, for example 384 kbps, can be allocated to an individual subscriber, since the radio resources are not excessively fragmented.

In accordance with an additional feature of the invention, the timeslots in the third portion are advantageously allocated locally, that is to say by the base station. It is also possible for individual timeslots to be used simultaneously by a plurality of base stations.

In accordance with an another feature of the invention, the mobile station is allocated a timeslot in the first portion with higher priority than a timeslot in the third portion. There is a thus a high probability of resources which can be allocated dynamically being available when needed. Furthermore, a timeslot in the third portion is allocated for the mobile station with higher priority than a handover to an adjacent base station.

To allow an adequate timeslot to be allocated for a radio connection, interference measurements are carried out by the base station and/or by the mobile station, so that a suitable timeslot is selected for a connection or, when a timeslot is released by another connection, a handover of the connection to this timeslot is initiated.

The time orthogonality of th e utilization of timeslots for different cells can be limited to the user information transmission. Advantageously, an organization channel is set up in the downlink direction, and/or an access channel for a plurality of base stations is set up in the uplink direction, in each case in a common timeslot. These measures improve resource utilization.

Other features which are considered as characteristic for the invention are set forth in the appended claims.

Although the invention is illustrated and described herein as embodied in method and base station system for channel allocation in a radio communications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
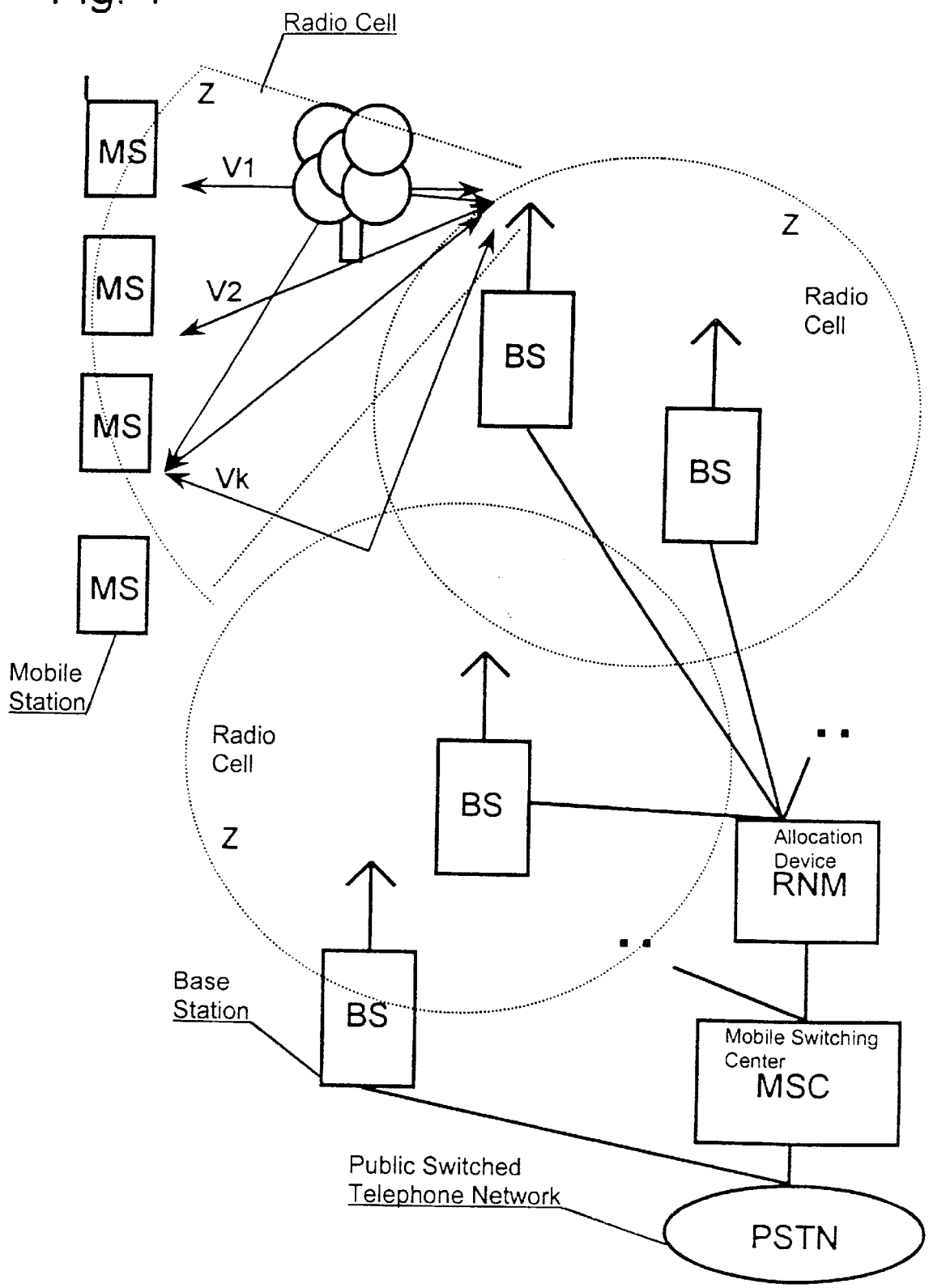
FIG. 1 shows a block diagram of a mobile radio system.

Referring now to the figures of the drawing in detail and first, particularly, to FIG. 1 thereof, there is shown an example of a radio communications system, namely a mobile radio system that includes a multiplicity of mobile switching centers MSC which are networked to one another and produce access to a public switched telephone network PSTN. Furthermore, these mobile switching centers MSC are each connected to at least one device RNM for allocating radio resources. Each of these devices RNM in turn allows a connection to at least one base station BS. Such a base station BS can set up a connection to further radio stations, for example mobile stations MS or any other mobile and stationary terminals, via a radio interface. At least one radio cell Z is formed by each base station BS. In the case of sectorization or in the case of hierarchical cell structures, a plurality of radio cells Z are also supplied by each installed base station BS. For the purposes of the invention, an installed base station forms a plurality of virtual base stations BS.

The device RNM for allocating radio resources, and a plurality of base stations BS, form a base station system.

By way of example, FIG. 1 shows connections V1, V2, Vk for transmitting user information and signaling information between mobile stations MS and a base station BS. An operation and maintenance center provides monitoring and maintenance functions for the mobile radio system, or for parts of it. The functionality of this structure can be transferred to other radio communications systems in which the invention can be used, in particular for subscriber access networks with wire-free subscriber access. Base stations which are used as home base stations in the private domain can also set up connections to mobile stations MS, without being affected by the radio network planning. These home base stations are connected to a public switched telephone network.

Figure 2:
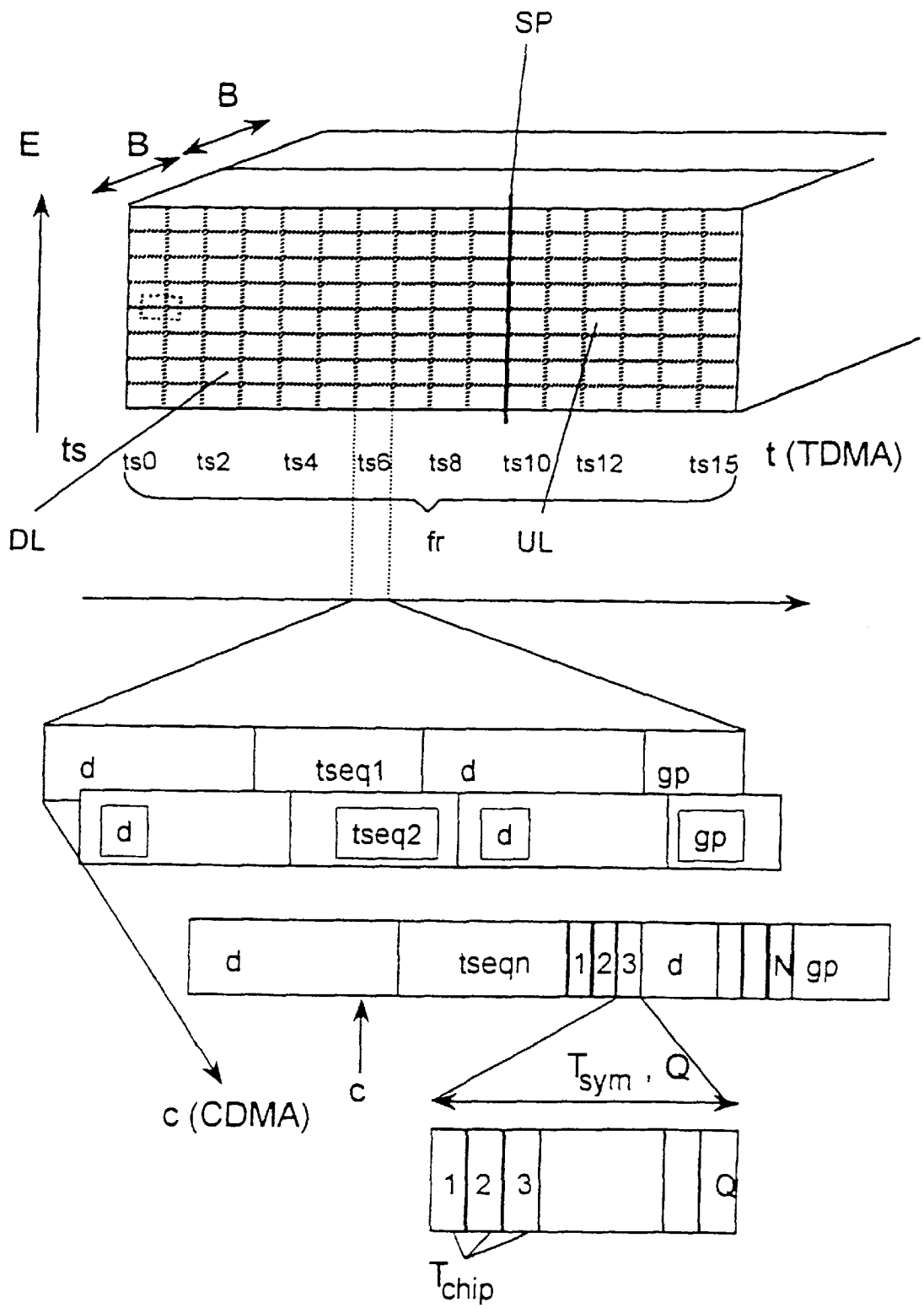
FIG. 2 shows a schematic illustration of the frame structure of the TDD transmission method.

The frame structure for radio transmission is shown in FIG. 2. A broadband frequency band, for example with a bandwidth of B=5 MHz, is split up in accordance with a TDMA component into a plurality of timeslots ts of equal time duration, for example into 16 timeslots ts0 to ts15. A portion of the timeslots ts0 to ts9 is used in the downlink direction DL, and a portion of the timeslots ts10 to ts15 is used in the uplink direction UL. In between, there is a switching point SP. In this TDD transmission method, the frequency band for the uplink direction UL corresponds to the frequency band for the downlink direction DL. This is also repeated for further carrier frequencies.

Information from a plurality of connections is transmitted in radio blocks within a timeslot which is intended for user data transmission. These radio blocks for user data transmission comprise sections with data d, in which training sequences tseq1 to tseqn which are known at the receiving end are embedded. The data d are spread on a connection-specific basis with a fine structure, a subscriber code c, so that, for example, n connections can be separated by this CDMA component at the receiving end.

The spreading of individual symbols in the data d means that Q chips of duration $T_{chip}$ are transmitted within the symbol duration $T_{sym}$. The Q chips in this case form the connection-specific subscriber code c. Furthermore, a guard time gp is provided within the timeslot ts, in order to compensate for different signal delay times between the connections.

Within a broadband frequency band B, the successive timeslots ts are broken down in accordance with a frame structure. Sixteen timeslots ts are thus combined to form a frame fr.

The radio interface parameters used are, advantageously:
Chip rate: 4096 Mcps
Frame duration: 10 ms
Number of timeslots: 16
Duration of a timeslot: 625 $\mu$s
Spread factor: 16
Modulation type: QPSK
Bandwidth: 5 MHz
Frequency reuse cluster: 1

These parameters allow the best-possible harmonization with an FDD (frequency division duplex) mode for the 3rd mobile radio generation. The switching point SP within a group of cells is advantageously selected in the same way.

Figure 3:
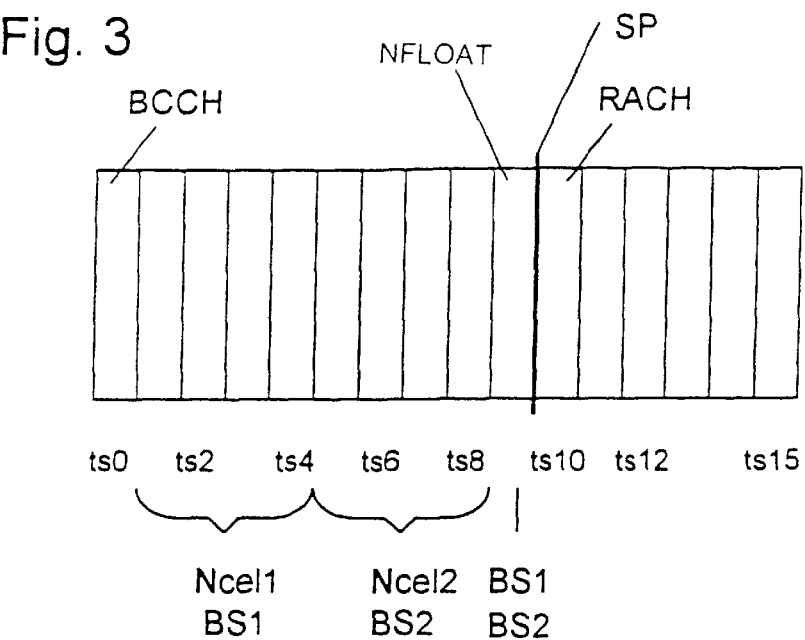
FIG. 3 shows a schematic illustration of the channel allocation for a plurality of base stations.

The following channel allocation is carried out, as shown in FIG. 3, for the downlink direction DL. The first timeslot ts0 is used for signaling in an organization channel BCCH. This timeslot ts0 is used by a plurality of base stations BS1, BS2.

The timeslots ts1 to ts4 are permanently allocated to the first base station BS1, and the timeslots ts5 to ts8 are permanently allocated to the second base station BS2, in which case this allocation can also be administered by the operation and maintenance center. The timeslot ts9 following this can be allocated dynamically to one of the base stations BS1 or BS2. This is done on a load-related basis.

The first portion Ncell of the timeslots ts is thus the timeslots ts1 to ts4, the second portion Ncel2 is thus the timeslots ts5 to ts8, and the third portion Nfloat is the timeslot ts9. Alternatively, the organization channel BCCH can also be set up immediately before the switching point SP. Other combinations can be administered in accordance with the characteristics of the network plan. The third portion Nfloat becomes larger, the less uniform the traffic is and the lower the overall traffic load. I. Katzela and M. Naghshineh, "Channel Assignment Schemes for Cellular Mobile Telecommunication Systems: A Comprehensive Survey", IEEE Personal Communications, June 1996, pages 19–22, shows examples for matched splitting of channels.

After the switching point SP, which can likewise be administered, an access channel RACH is set up in the timeslot ts10, in which access channel RACH, the mobile stations MS of the radio cells can transmit an access block to request radio resources. In the uplink direction UL, all the base stations BS1, BS2 receive simultaneously, and no splitting of the timeslots is envisaged here.

Figure 4:
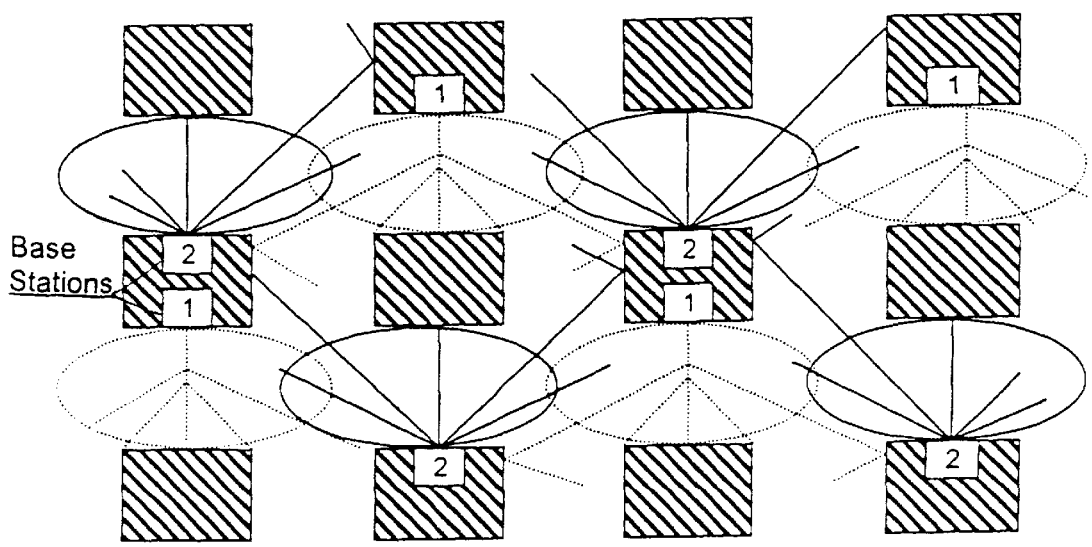
FIG. 4 shows an interference scenario for a microcell model.

The breakdown as shown in FIG. 3 is particularly advantageous for a mobile radio system which is broken down into microcells as shown in FIG. 4. The side roads are supplied by reflections or by special antennas. A cluster is formed using time subdivision for a frequency reuse cluster of unity for the base stations denoted by 1 and 2. The physical arrangement of the base stations 1 and 2 would result in excessively strong interference occurring between the radio cells of adjacent base stations with a frequency reuse cluster of unity. The method can also be applied to a grouping with a cluster larger than two. The respective grouping results from the morphology and the interference levels associated with it, which are caused by the adjacent cells. The larger the signal-to-noise ratio is, the smaller may be the time grouping.

Figure 5:
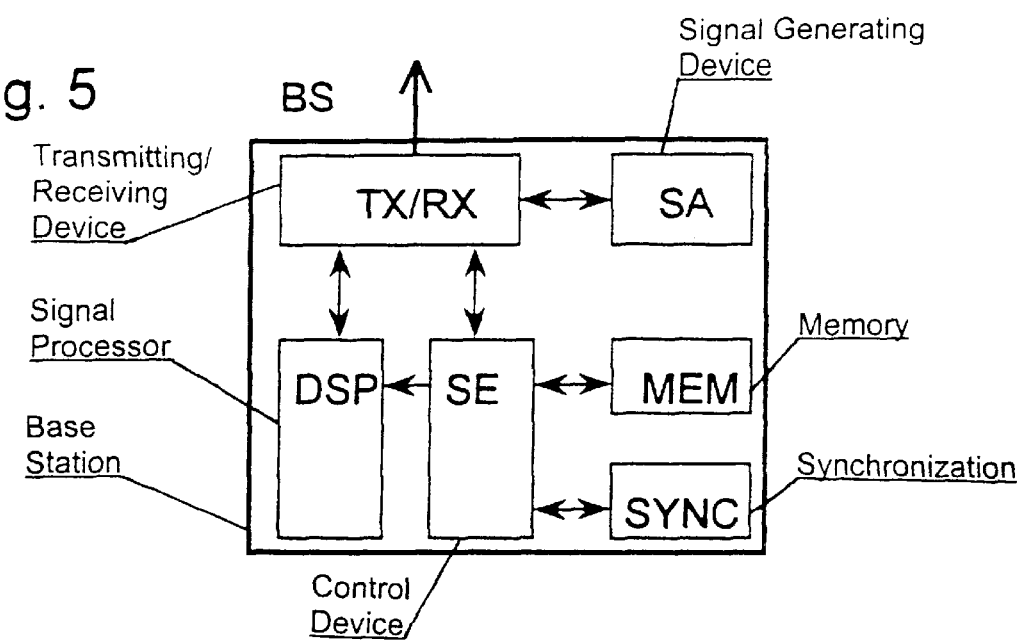
FIG. 5 shows a simplified block diagram of a base station.

The channel allocation is carried out in a base station BS as shown in FIG. 5, taking into account the administration by the organization and maintenance center and the requirements of the device RNM for allocation of radio resources. This comprises a transmitting/receiving device TX/RX, which carries out digital/analog conversion of transmission signals which are to be transmitted, converts them from baseband to the transmission frequency band, and modulates and amplifies the transmission signals. A signal generating device SA has already composed the transmission signals into radio blocks and assigned them to the corresponding frequency band and timeslot. A signal processing device DSP evaluates signals received via the transmitting/receiving device TX/RX.

The interaction of the components and the setting of the transmission time after synchronization are controlled by a control device SE. Associated data about the transmission and switching time SP, and the specific characteristics of the connections, are stored in a memory device MEM.

Figure 6:
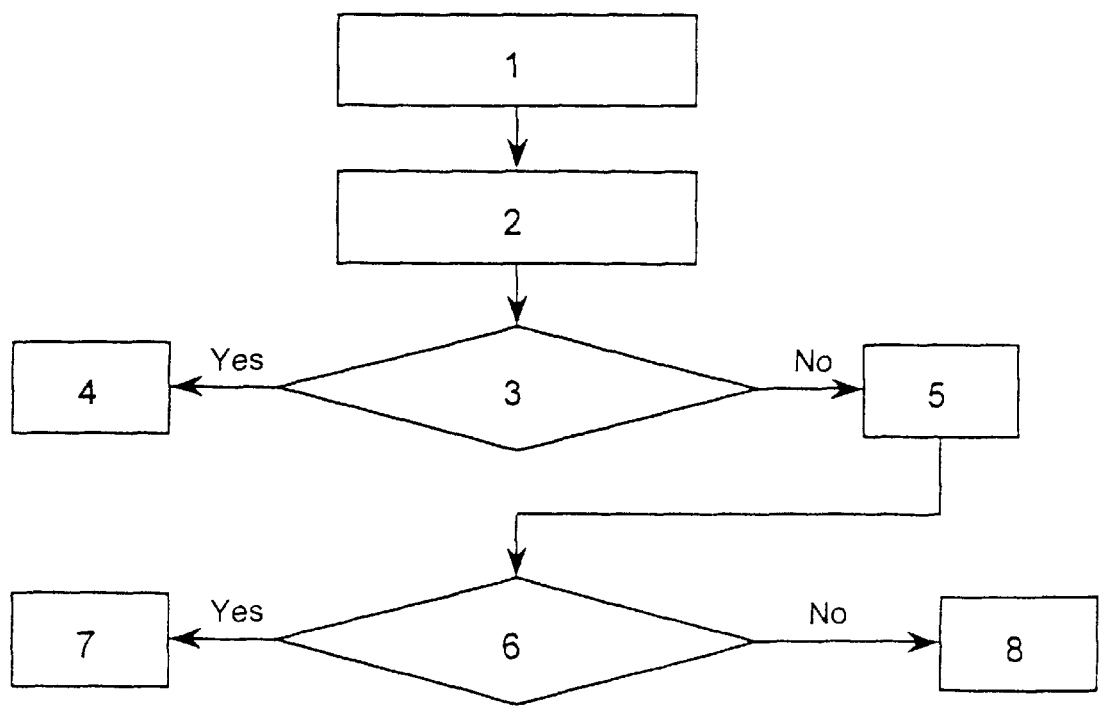
FIG. 6 shows a flowchart for channel allocation.

FIG. 6 shows the synchronization sequence. In a first step 1, the mobile station MS receives the signals on the organization channels BCCH from one or more base stations BS1, BS2, and measures the interference in the various timeslots ts. The radio cell having the most powerful organization channel BCCH is selected, and a request corresponding to this for allocation of radio resources is sent in the access channel RACH.

In a second step 2, the base stations BS1, BS2 measure the signals in the timeslots in the uplink direction UL. The resource request from the mobile station MS is thus recognized, for example by the first base station BS1.

In a third step 3, the decision is made as to whether it is possible to allocate a timeslot ts in the first portion Ncell of the timeslot ts to the mobile station MS. If this is the case, by virtue of an adequate signal-to-noise ratio, then, in a fourth step 4, the mobile station MS is allocated a channel, that is to say a frequency band B, a timeslot ts and a subscriber code c via an allocation channel.

If this is not possible, then, in a fifth step 5, a timeslot ts in the third portion Nfloat is used. In a sixth step 6, a question is then asked to determine whether a sufficient signal-to-noise ratio is guaranteed for the connection in this timeslot ts. If this is the case, then, in a seventh step 7, the mobile station MS is allocated a channel in this timeslot ts. If, at a later time, a timeslot ts in the first portion Ncell becomes free, or free to a sufficient extent for the connection, then redistribution to this timeslot ts is carried out.

If there is no timeslot ts in the third portion for the connection either, the request for resource allocation is rejected, or is placed in a queue. Alternatively, a timeslot can be borrowed from an adjacent base station. At the same time, this represents the lowest priority. It is possible to administer whether this option is allowed.

The mobile station MS and/or the base station BS are/is informed by their or its own interference measurements and by interference measurements by the respective other station MS, BS, during registration and during operation, about the interference situation in the timeslots ts in the uplink direction UL and downlink direction DL. A local channel allocation method can thus be provided, in which those timeslots ts which are advantageous in terms of the interference situation can be requested and allocated.

A virtual time cluster is set which, because of the time orthogonality, results in a reduction in the intercell interference without in the process leading to the disadvantages of rigid channel allocation, such as a low traffic load and lack of support for higher-rate data services. The allocation of channels is prioritized, is very flexible and can support a cell plan with a frequency reuse cluster which is as small as possible. The hybrid channel allocation method provides an efficient solution, matched to the cell environment, in a broadband TDD mobile radio system, with regard to:

low blocking probability,
low probability of connection breakdown,
low signal load by redistribution of the channel allocation, and
capability to cope with a high traffic load.

We claim:

1. A method for channel allocation in a radio communications system, which comprises:
   using a TDMA transmission method to carrying out radio transmission between mobile stations and at least two base stations;
   allocating at least partially different timeslots to a first base station and to a second base station for transmissions in a downlink direction such that cetain timeslots are allocated to the first base station and not to the second base station and certain other timeslots are allocated to the second base station and not to the first base station; and
   transmitting in an uplink direction without splitting the timeslots between the first base station and the second base station.

2. The method according to claim 1, which comprises:
   using timeslots in one frequency band for the uplink direction and the downlink direction in accordance with a time division duplex transmission method.

3. The method according to claim 1, which comprises:
   permanently allocating first timeslots to a plurality of base stations; and
   dynamically allocating further timeslots.

4. The method as claimed in claim 3, which comprises allocating the further timeslots to the plurality of base stations on a load-related basis.

5. The method according to claim 3, which comprises allocating one timeslot of the further timeslots for a mobile station with a higher priority than a handover to an adjacent base station.

6. The method according to claim 1, which comprises:
   selecting a suitable timeslot for a connection by carrying out interference measurements with a station selected from the group consisting of a base station and a mobile station; and
   when a timeslot is released by another connection, initiating a handover of the connection to the released timeslot.

7. The method according to claim 1, wherein adjacent base stations use the same frequency band.

8. The method according to claim 1, which comprises using a TDMA/CDMA subscriber separation method to carry out the radio transmission.

9. A base station system for a radio communications system, comprising:
   a first base station and a second base station for carrying out radio transmissions to mobile stations in accordance with a TDMA transmission method such that timeslots in one frequency band are used for an uplink direction and a downlink direction; and
   a device for allocating radio resources, said device for allocating at least partially different timeslots for transmissions in the downlink direction to the first base station and to the second base station, said device configured for transmissions in the uplink direction such that timeslots are not split between the first base station and the second base station.

* * * * *